Patented July 21, 1942

2,290,563

UNITED STATES PATENT OFFICE 2,290,563

WAX COATING

Toivo A. Kauppi, Midland, Mich., assignor to The Dow Chemical Company, Midland, Mich., a corporation of Michigan No Drawing. Application April 23, 1940, Serial No. 331,214

7 Claims. (Cl. 106—173)

This invention relates to improved moisture-proof coatings and impregnations for paper and the like.

Paraffin wax, applied in a molten condition, is very commonly used for moisture-proofing paper, fabrics, and the like. The most effective moisture-proofing coatings are those consisting of paraffin wax of high melting point, (M. P. above 100° C.). However, such coatings are very brittle and become fractured and discontinuous with comparatively little handling or wear. In this state they are almost useless for protection against moisture.

Paraffin waxes of lower melting points, or paraffin wax compositions containing mineral oils or other softening agents have been used to obtain less brittle coatings, but these coatings still lack toughness; they are soft and they "block" when objects are lightly pressed against them.

Tough, flexible moisture-proof coatings have been developed for use on regenerated cellulose and similar structureless films. The majority of these contain only a minor proportion of paraffin wax, the remainder of the compositions consisting of a combination of a cellulose derivative together with one or more ingredients from the class of resins, plasticizers, or ester-type waxes. Such ingredients are comparatively expensive and consequently compositions containing them cannot be used economically for such purposes as the coating of paper for use in interliners for food packages, for milk and other fluid containers and the like. Also, as a consequence of their limited wax content, their moisture-proofing qualities are also limited.

A few moisture-proof coatings have been described in the prior art which comprise a major proportion of paraffin wax and minor proportions of a cellulose ester, and other adjuvants. These compositions have to be dissolved in a solvent in order to be applied, the solvent being such that it is capable of dissolving each ingredient separately, otherwise a non-homogeneous coating is obtained. This fact makes such coating compositions impractical for paper and fabric coating purposes, for, apart from the high cost of such specialized solvents, paraffin wax is so highly retentive of all solvents that the drying of coatings containing large proportions of paraffin wax is a long and costly operation.

It is, therefore, an object of the present invention to make a moisture-proof composition comprising a major proportion of paraffin wax, which is capable of being applied in the molten condition to form tough, flexible and nonblocking coatings.

A further object is to make a tough, flexible, nonblocking, heat-sealing coated moisture- and water-proof fibrous sheet which is capable of being crumpled or flexed without destroying the water proofness of the coating.

These and related objects are attained by preparing a composition containing the hereinafter stated ingredients within the recited proportions, and applying it to a fibrous sheet in a molten condition.

|  | Per cent by weight |
|---|---|
| Low viscosity ethyl cellulose of ethoxy content greater than 48% | 18–25 |
| Paraffin wax | 50–60 |
| Blending agent | Remainder |

The blending agent employed should be compatible with both the ethyl cellulose and the paraffin wax, and should bring about compatibility between these two ingredients. It has been found that the resins which can be used as blending agents are compatible with ethyl cellulose only if they have the further common property of being soluble in naphtha. The blending agent may be one or a mixture of naphtha-soluble resins alone or in combination with a compatible ester-type wax. Satisfactory waxes of this type include Japan wax, montan wax, and 12-hydroxy stearin ("Opal" wax), to name but a few. Useful resins to be employed for the purpose include the naphtha-soluble members of the following classes of resins. At least one specific example is given of a naphtha-soluble member of each resin class listed.

Table I

| Class of resin | Examples |
|---|---|
| Pure phenolic | Super Beckacite 2000. Durez 570. |
| Resin modified phenolic | Beckacite 1101. Amberol B/S-1. |
| Cumarone—indene | Cumar W-½. Neville R.9. |
| Oil-modified phenolic | Bakelite resin No. 302. |
| Oxidizing-type alkyd | Rezyl 880-1. |
| Ester gum | Ester gum No. 5. |
| Natural resin | Rosin. Gum dammar. |

It is to be understood that not all members of the herein listed classes of resins are soluble in naphtha, although each of the said classes contain a number of suitable, commercially available resins. So far as is known, the term "naphtha-soluble resins" excludes all non-operative resins, and is inclusive of all operative resins.

A particularly good composition falling within the scope of the invention consists of

| | |
|---|---|
| Low viscosity ethyl cellulose of over 48% ethoxy | 20 |
| Hydrogenated rosin | 15 |
| Paraffin wax (M. P. above 100° C.) | 50–55 |
| Ester gum — In amounts within stated range to bring total to 100 parts. | 0–10 |
| 12-hydroxy stearin — | 15–5 |

In order to prepare the new melts, the waxes and resin, in amounts within the hereinbefore stated proportions, are melted together at a temperature of about 145° C. or above, and ethyl cellulose is stirred in until it is dispersed.

Paraffin wax appears to possess a latent solvent power for ethyl cellulose of ethoxy content greater than 48 per cent so that the addition of a comparatively minor proportion of blending agent enables homogeneous melts to be obtained. This property is absent from ethyl cellulose of lower ethoxy content and from the commercially available cellulose esters such as cellulose acetate, cellulose-acetate-butyrate and cellulose nitrate. These ester derivatives fail to go into solution when melted together with major proportions of paraffin wax in the presence of resins which are individually compatible with the paraffin and the cellulose ester. The incompatible mixtures obtained are unsuitable for use as coating compositions to be applied as melts. Coatings from them lack toughness and flexibility and are inferior to unmodified wax coatings in glossiness.

By the herein-before stated term "low viscosity ethyl cellulose" is understood ethyl cellulose having a viscosity (as measured on a 5 per cent solution of the material in a solvent composed of 80:20 toluene and ethanol by volume) of less than about 30 centipoises. This low viscosity type of cellulose ether is used in order to keep the viscosity of the hot-melt compositions, of which it is a constituent, at a low level to prevent coating difficulties. It is preferred to apply the hot-melt compositions of the present invention at temperatures lying between about 140° C. and 160° C., and to prevent practical difficulties when using the customary wax coating machines, it is necessary that the hot-melt being applied should possess a viscosity of less than about 3000 centipoises at these temperatures and, preferably, less than about 1500 centipoises. These conditions can all be met through the employment of the hereinbefore defined composition. Temperatures substantially greater than the stated 160° C. should not be used, as paper and fabrics are damaged by exposure to such elevated temperatures, even during the short time which is necessary to coat them.

The practice of the invention is illustrated by the examples given in Table II, which shows four compositions (Nos. 1–4) which, when applied as hot-melts to wrapping paper, gave coated products possessing a high degree of moisture and water impermeability together with heat-sealing properties. The coatings were of such a tough, flexible nature, that containers comprising them retained their ability to hold water for an indefinite period, even after wrinkling and crumpling of a type which usually causes wax coatings to fail.

The properties of compositions numbered from 5 to 7, inclusive, of Table II illustrate the critical nature of the stated limits as to amount of each ingredient. Apparently because all three compositions contain a little less than the stated minimum amount of ethyl cellulose, all of them lack satisfactory heat-sealing properties. When the amount of paraffin wax present is raised substantially above the stated limit of 60 per cent (No. 6), an incompatible mixture results, and when the quantity of paraffin wax is substantially below the lower limit of 50 per cent (No. 7), the "block" test fails.

Table II

| No. | Composition of hot-melt in percentage by weight | | | | | Properties | | |
|---|---|---|---|---|---|---|---|---|
| | Ethyl cellulose | Hydrogenated rosin | Ester gum No. 6 | 12-hydroxy stearin | Paraffin wax M.P. 136° C. | Block test | Heat-sealing properties | |
| | | | | | | | Melt to melt | Melt to paper |
| 1 | 20 | 15 | | 10 | 55 | Satisfactory | Very good | Good. |
| 2 | 20 | 15 | | 5 | 50 | ----do----- | -----do----- | Do. |
| 3 | 20 | 15 | 10 | | 50 | ----do----- | -----do----- | Very good. |
| 4 | 20 | 15 | 5 | | 55 | ----do----- | -----do----- | Do. |
| 5 | 15 | 15 | | 10 | 60 | ----do----- | Good | Do. |
| 6 | 15 | 20 | | | 65 | ----do----- | Poor | Good. |
| 7 | 15 | 20 | | 25 | 40 | Poor | Incompatible mixture. Fair | Fair. |

Referring to Table II, Ester Gum No. 6 is a rosin ester possessing the following properties: specific gravity 1.09, acid number 4–6, softening point 90°–94° C.

The "block" test referred to was carried out by taking 3 sheets of coated paper and stacking them so that two of the sheets were in face to face relationship and the third sheet was placed so that its face was in contact with the back of one of the other two sheets. A pound weight having a flat base of area equal to one square inch was placed on the stacked sheets and the whole assembly stored in an oven at 50° C. for 16 hours. Any "blocking," as shown by the marring of a coated surface, was noted.

Heat-sealing properties were simply determined by taking four pieces of the hot-melt coated paper under examination, and pressing two of them together face to face and the other two face to back by means of a hot iron. The quality of the seals thus produced is judged from the force necessary to pull the two pieces of paper apart. In the case of a really good seal, the paper is damaged in attempting to separate the sealed coated sheets.

The compositions of the present invention may be applied to a wide variety of papers and fabrics for the purpose of moisture-proofing or water-proofing. Coated papers of the instant invention are particularly useful for making heatsealed, moisture-proofed and water-proofed liners for food packages, either for solids, such as dry cereals, or for liquids, such as milk.

Other modes of applying the principle of my invention may be employed instead of those explained, change being made as regards the materials employed, provided the ingredients stated by any of the following claims or the equivalent of such stated ingredients be employed.

I therefore particularly point out and distinctly claim as my invention:

1. A coating composition adapted to be applied in a molten condition at a temperature below 160° C. to yield a tough water-impermeable coating, consisting of the following ingredients within about the recited range of proportions:

| | Per cent by weight |
|---|---|
| Low viscosity ethyl cellulose of ethoxy content greater than 48% | 18–25 |
| Paraffin wax, M. P. above 100° C | 50–60 |
| Blending agent selected from the group consisting of naphtha-soluble resins and mixtures thereof with one another and with compatible ester-type waxes | Remainder |

2. A coating composition as in claim 1, wherein the blending agent is a naphtha-soluble resin.

3. A coating composition as in claim 1, wherein the blending agent comprises hydrogenated rosin.

4. A coating composition as in claim 1, wherein the blending agent consists of a mixture of a naphtha-soluble resin and an ester-type wax.

5. A coating composition as in claim 1, wherein the blending agent consists of a mixture of hydrogenated rosin and 12-hydroxy stearin.

6. A coated, water-proofed, wrapping material consisting of a fibrous sheet coated with the composition of claim 1.

7. A coated, water-proofed, wrapping material consisting of a paper sheet coated with the composition of claim 1.

TOIVO A. KAUPPI.